US008848793B2

(12) United States Patent
Chen et al.

(10) Patent No.: US 8,848,793 B2
(45) Date of Patent: Sep. 30, 2014

(54) METHOD AND SYSTEM FOR VIDEO COMPRESSION WITH INTEGRATED PICTURE RATE UP-CONVERSION

(75) Inventors: Xuemin Chen, San Diego, CA (US); Brian Heng, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1105 days.

(21) Appl. No.: 11/931,808

(22) Filed: Oct. 31, 2007

(65) Prior Publication Data

US 2009/0110304 A1    Apr. 30, 2009

(51) Int. Cl.
*H04N 7/12* (2006.01)
*H04N 11/02* (2006.01)
*H04N 11/04* (2006.01)
*H04N 19/577* (2014.01)
*H04N 19/46* (2014.01)
*H04N 19/85* (2014.01)
*H04N 19/61* (2014.01)
*H04N 19/527* (2014.01)
*H04N 19/87* (2014.01)

(52) U.S. Cl.
CPC ... *H04N 19/00593* (2013.01); *H04N 19/00721* (2013.01); *H04N 19/00545* (2013.01); *H04N 19/00903* (2013.01); *H04N 19/00781* (2013.01); *H04N 19/00921* (2013.01)
USPC .................................................... 375/240.16

(58) Field of Classification Search
None
See application file for complete search history.

(56) References Cited

U.S. PATENT DOCUMENTS

| | | | |
|---|---|---|---|
| 7,852,938 B2 * | 12/2010 | Shi et al. ................. | 375/240.16 |
| 2003/0198392 A1 * | 10/2003 | Jiang et al. ................. | 382/233 |
| 2004/0046891 A1 * | 3/2004 | Mishima et al. ............ | 348/459 |
| 2004/0101058 A1 * | 5/2004 | Sasai et al. ............... | 375/240.26 |
| 2006/0002465 A1 * | 1/2006 | Raveendran et al. ..... | 375/240.01 |
| 2006/0017843 A1 | 1/2006 | Shi et al. | |
| 2006/0018382 A1 * | 1/2006 | Shi et al. ................. | 375/240.16 |
| 2006/0018383 A1 * | 1/2006 | Shi et al. ................. | 375/240.16 |
| 2006/0165176 A1 * | 7/2006 | Raveendran et al. ..... | 375/240.16 |
| 2006/0215761 A1 * | 9/2006 | Shi et al. ................. | 375/240.16 |
| 2006/0256238 A1 * | 11/2006 | Mishima et al. ............ | 348/459 |
| 2006/0268990 A1 * | 11/2006 | Lin et al. ................. | 375/240.24 |
| 2007/0014477 A1 | 1/2007 | MacInnis et al. | |
| 2007/0076796 A1 * | 4/2007 | Shi et al. ................. | 375/240.16 |
| 2007/0127572 A1 * | 6/2007 | Sasai et al. ............... | 375/240.16 |
| 2007/0211800 A1 * | 9/2007 | Shi et al. ................. | 375/240.16 |
| 2007/0230563 A1 * | 10/2007 | Tian et al. ................. | 375/240.01 |

(Continued)

FOREIGN PATENT DOCUMENTS

| CN | 1981536 A | 6/2007 |
|---|---|---|
| KR | 2007-40397 | 4/2007 |

*Primary Examiner* — Suk Jin Kang
(74) *Attorney, Agent, or Firm* — Foley & Lardner LLP

(57) ABSTRACT

Certain aspects of a method and system for video compression with integrated picture rate up-conversion (PRUC) may include generating picture rate up-conversion (PRUC) data from received video data while the received video data is being encoded. The generated PRUC data may be encoded and communicated to a decoder in order to enable generation of a plurality of interpolated pictures. The generated encoded PRUC data may be communicated via a sideband to the decoder or by embedding the generated encoded PRUC data within the encoded received video data prior to the communication to the decoder.

24 Claims, 8 Drawing Sheets

(56) References Cited

U.S. PATENT DOCUMENTS

| | | |
|---|---|---|
| 2007/0230578 A1* | 10/2007 | Shi et al. ............... 375/240.16 |
| 2007/0242748 A1 | 10/2007 | Mahadevan et al. |
| 2007/0291844 A1* | 12/2007 | Lu ........................ 375/240.16 |
| 2008/0025390 A1* | 1/2008 | Shi et al. ............... 375/240.02 |
| 2008/0151997 A1* | 6/2008 | Oguz ..................... 375/240.02 |
| 2008/0152005 A1* | 6/2008 | Oguz et al. ............ 375/240.12 |
| 2008/0165851 A1* | 7/2008 | Shi et al. ............... 375/240.16 |
| 2008/0170564 A1* | 7/2008 | Shi et al. ..................... 370/386 |
| 2008/0187048 A1* | 8/2008 | Baik et al. .............. 375/240.16 |
| 2011/0080955 A1 | 4/2011 | Shi et al. |

\* cited by examiner

US 8,848,793 B2

METHOD AND SYSTEM FOR VIDEO COMPRESSION WITH INTEGRATED PICTURE RATE UP-CONVERSION

CROSS-REFERENCE TO RELATED APPLICATIONS/INCORPORATION BY REFERENCE

None

FIELD OF THE INVENTION

Certain embodiments of the invention relate to digital video processing. More specifically, certain embodiments of the invention relate to a method and system for video compression with integrated picture rate up-conversion (PRUC).

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

There may be restrictions on channel capacity that may affect the display of low picture-rate pictures. For example, considering a 30 Hz video sequence that may be broadcast over a mobile network, the terminals, for example, mobile phones may receive an encoded video sequence from a server. However, due to bandwidth limitations, only a low bit-rate video sequence may be communicated. As a result, the encoder may remove two out of every three pictures to be transmitted, resulting in a sequence with a picture rate of about 10 Hz, for example. The terminal may be capable of displaying video at 30 Hz but since it receives a 10 Hz video, it may have to perform some form of picture-rate conversion.

Analog video may be received through broadcast, cable, and VCRs. The reception is often corrupted by noise, and therefore to improve the visual quality, noise reduction may be needed. Digital video may be received through broadcast, cable, satellite, Internet, and video discs. Digital video may be corrupted by noise, which may include coding artifacts, and to improve the visual quality and coding gain, noise reduction may be beneficial. Various noise filters have been utilized in video communication systems such as set top boxes. However, inaccurate noise characterization, especially during scenes with motion, may result in artifacts caused by the filtering, which are more visually detrimental than the original noise.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for video compression with integrated picture rate up-conversion (PRUC), substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for video compression with integrated picture rate up-conversion (PRUC). Various aspects of the invention may comprise generating picture rate up-conversion (PRUC) data from received video data while the received video data is being encoded. The generated PRUC data may be encoded and communicated to a decoder in order to enable generation of a plurality of interpolated pictures. The generated encoded PRUC data may be communicated via a sideband to the decoder by embedding the generated encoded PRUC data within the encoded received video data prior to the communication to the decoder.

Figure 1A:
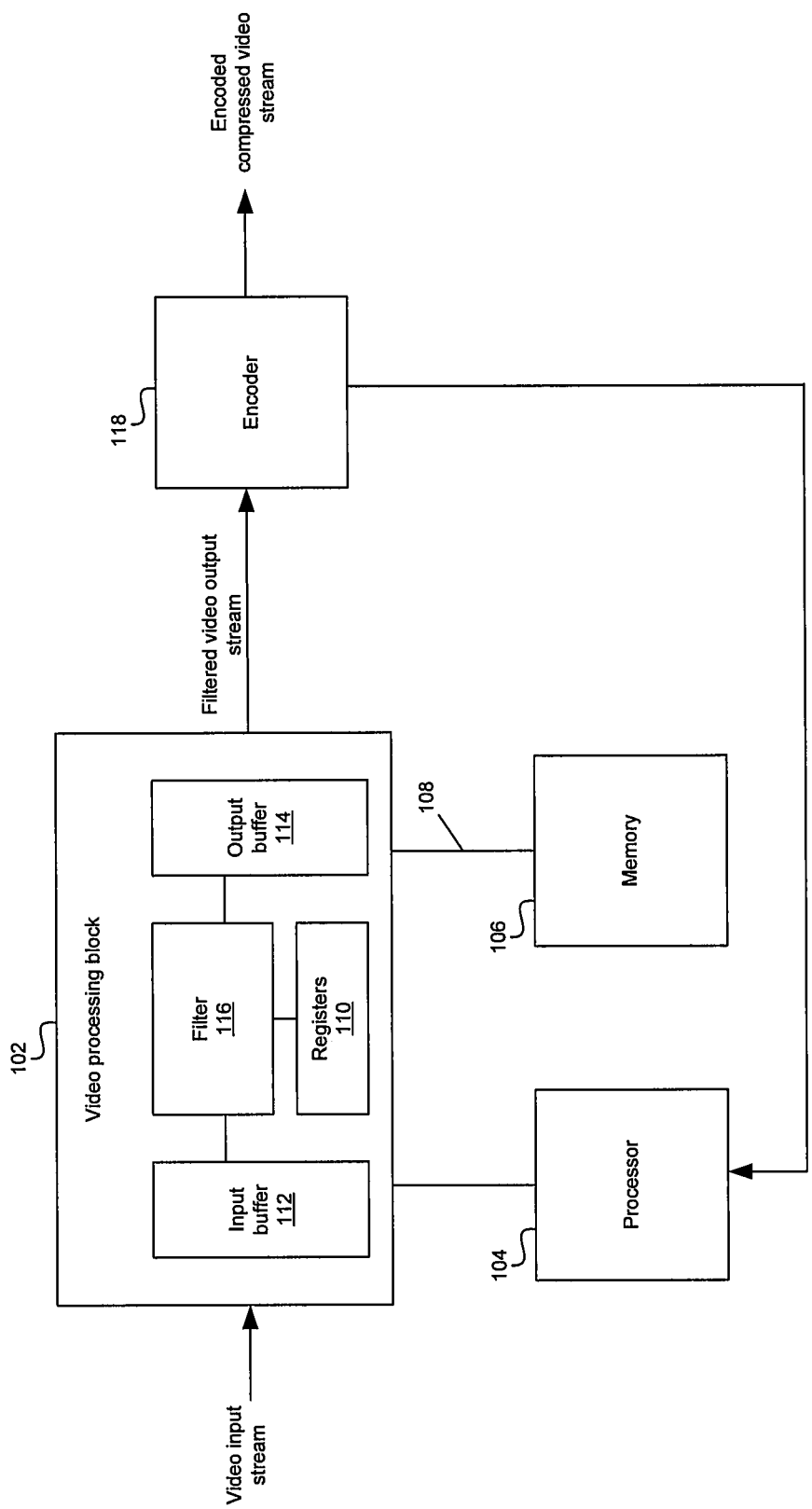
FIG. 1A is a block diagram of an exemplary video processing system, in accordance with an embodiment of the invention.

FIG. 1A is a block diagram of an exemplary video processing system, in accordance with an embodiment of the invention. Referring to FIG. 1A, there is shown a video processing block 102, a processor 104, a memory 106, an encoder 118 and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, and/or code that may be enabled to filter pixels in a video picture or a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing block 102 may be enabled to receive a video input stream and, in some instances, to buffer at least a portion of the received video input stream in the input buffer 112. In this regard, the input buffer 112 may comprise suitable logic, circuitry, and/or code that may be enabled to store at least a portion of the received video input stream. Similarly, the video processing block 102 may be enabled to generate a filtered video output stream to a video decoder and, in some instances, to buffer at least a portion of the generated filtered video output stream in the output buffer 114. In this regard, the output buffer 114 may comprise suitable logic, circuitry, and/or code that may be enabled to store at least a portion of the filtered video output stream.

The filter 116 in the video processing block 102 may comprise suitable logic, circuitry, and/or code that may be enabled to perform a filtering operation with noise reduction on the current pixel. In this regard, the filter 116 may be enabled to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. The registers 110 in the video processing block 102 may comprise suitable logic, circuitry, and/or code that may be enabled to store information that corresponds to filter coefficients, threshold levels, and/or constants, for example. Moreover, the registers 110 may be enabled to store information that corresponds to a selected filtering mode.

The processor 104 may comprise suitable logic, circuitry, and/or code that may be enabled to process data and/or perform system control operations. The processor 104 may be enabled to control at least a portion of the operations of the video processing block 102. For example, the processor 104 may generate at least one signal to control the selection of the filtering mode in the video processing block 102. Moreover, the processor 104 may be enabled to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108.

The memory 106 may comprise suitable logic, circuitry, and/or code that may be enabled to store information that may be utilized by the video processing block 102 to reduce noise in the video input stream. The memory 106 may be enabled to store filter coefficients, threshold levels, and/or constants, for example, to be utilized by the video processing block 102.

The encoder 118 may be enabled to receive and process a plurality of statistical inputs from the processor 104 and the video processing block 102. The encoder 118 may be enabled to generate the encoded compressed video stream based on encoding the filtered video output stream.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pixels in a video picture in accordance with the selected filtering mode. In some instances, the video input stream may be stored in the input buffer 112 before processing. The video processing block 102 may generate the appropriate blending factors needed to perform the noise reduction filtering operation selected by the processor 104. The video processing block 102 may generate the filtered video output stream after performing the noise reduction filtering operation. In some instances, the filtered video output stream may be stored in the output buffer 114 before being transferred out of the video processing block 102.

The processor 104 may determine the mode of operation of various portions of the video processing block 102. For example, the processor 104 may configure data registers in the video processing block 102 to allow direct memory access (DMA) transfers of video data to the memory 106. The processor 104 may also communicate instructions to an image sensor to initiate capturing of images. The memory 106 may be used to store image data that may be processed and communicated by the processor 104. The memory 106 may also be used for storing code and/or data that may be used by the processor 104. The memory 106 may also be used to store data for other functionalities of the video processing block 102. For example, the memory 106 may store data corresponding to voice communication. The processor 104 may comprise a state machine that may enable determination of whether video data type is interlaced type or progressive type.

The processor 104 may be enabled to generate PRUC data from received video data while the received video data is being encoded by the encoder 118. The encoder 118 may be enabled to encode the generated PRUC data and communicate the encoded PRUC data to a decoder.

Figure 1B:
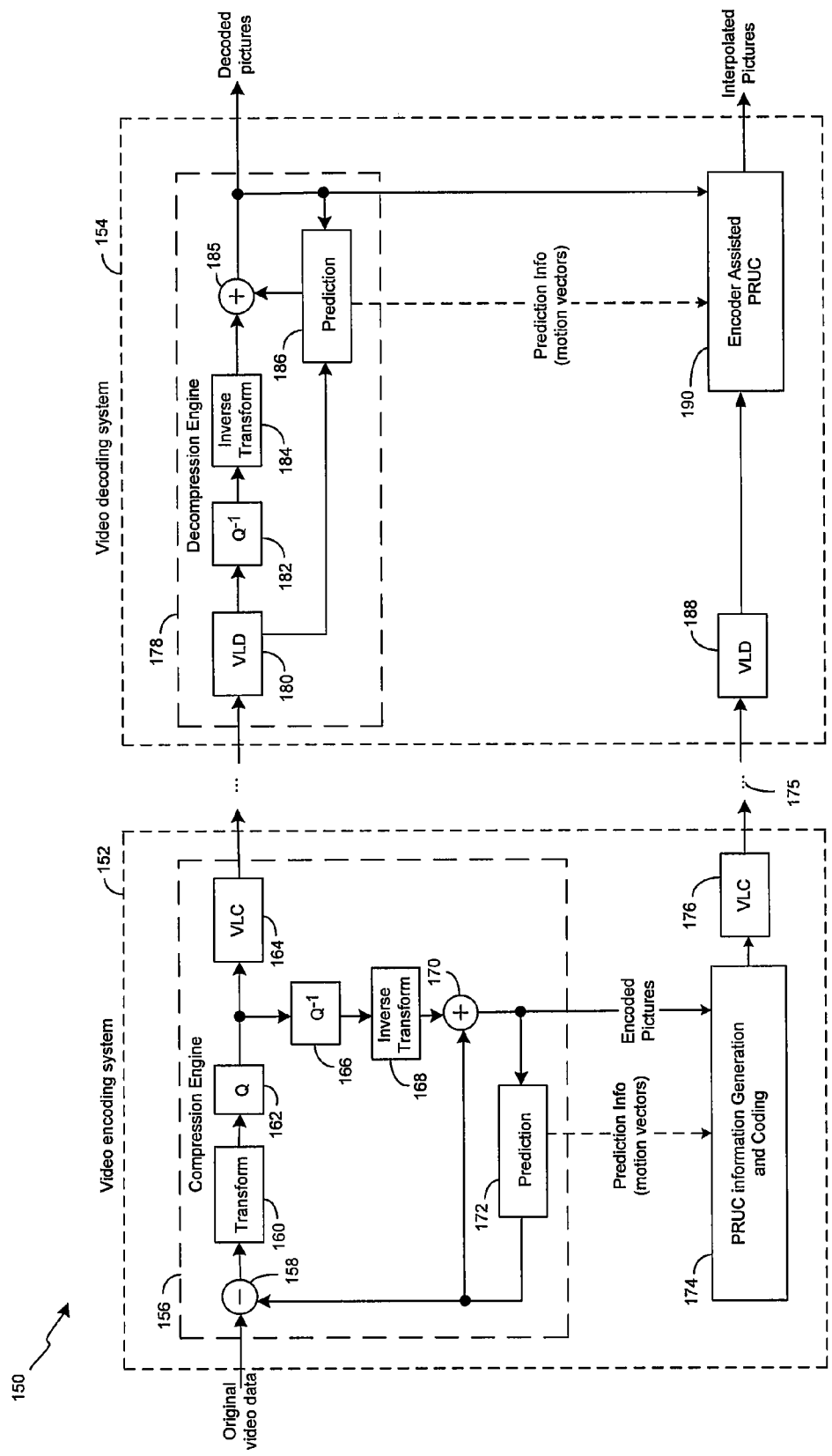
FIG. 1B is a block diagram of an exemplary video processing system for video compression with integrated picture rate up-conversion (PRUC), in accordance with an embodiment of the invention.

FIG. 1B is a block diagram of an exemplary video processing system for video compression with integrated picture rate up-conversion (PRUC), in accordance with an embodiment of the invention. Referring to FIG. 1B, there is shown a video processing system 150. The video processing system 150 may comprise a video encoding system 152 and a video decoding system 154. The video encoding system 152 and the video decoding system 154 may be associated with a particular video standard, for example, MPEG-2, H.264/MPEG-4 AVC, VC1 and VP6.

The video encoding system 152 may comprise a compression engine 156, a PRUC information generation and coding block 174 and a variable length entropy encoder (VLC) 176. The compression engine 156 may comprise a subtractor 158, a transform block 160, a quantizer 162, a VLC 164, an inverse quantizer 166, an inverse transform block 168, a summer 170 and a prediction block 172.

The video decoding system 154 may comprise a decompression engine 178, an encoder assisted PRUC block 190 and a variable length entropy decoder (VLD) 188. The decompression engine 178 may comprise a VLD 180, an inverse quantizer 182, an inverse transform block 184, a summer 185 and a prediction block 186.

The compression engine 152 may be enabled to receive video data or original pictures. The transform block 160 may comprise suitable logic, circuitry and/or code that may be enabled to perform a transform, for example, DCT transform of the received video data or original pictures. The transform block 160 may generate DCT coefficients, which may be communicated to the quantizer 162. The quantizer 162 may comprise suitable logic, circuitry and/or code that may be enabled to generate quantized coefficients. The VLC 164 may comprise suitable logic, circuitry and/or code that may be enabled to encode and scan the generated quantized coefficients using zig-zag or alternate scan and communicate the encoded video data to the video decoding system 154.

The inverse quantizer 166 may comprise suitable logic, circuitry and/or code that may be enabled to process the generated quantized coefficients from the quantizer 162 in order to generate quantized residue data. The inverse transform block 168 may comprise suitable logic, circuitry and/or code that may be enabled to generate reconstructed residual pictures to the summer 170 for processing subsequent video pictures.

An encoding method, for example, MPEG-2, H.264/MPEG-4 AVC, VC1 and VP6 may be utilized to generate one or more motion vectors. The motion vectors may be communicated to the prediction block 172, which may use the motion vectors to generate a motion compensated block of pictures from the reconstructed pictures. The subtractor 158 may be enabled to subtract the motion compensated block pictures from the original pictures, and the resultant residual pictures may be processed by the transform block 160.

The PRUC information generation and coding block 174 may comprise suitable logic, circuitry and/or code that may be enabled to generate PRUC data from received video data while the received video data is being encoded by the compression engine 156. The PRUC information generation and coding block 174 may be enabled to receive prediction information, for example, motion vector information from the prediction block 172. The PRUC information generation and coding block 174 may be enabled to receive encoded pictures from the compression engine 156.

The generated PRUC data may comprise at least one of: motion vector information, interpolation block size, adaptive interpolation parameters, block coding modes, quantization levels, quantized residual data and encoded pictures from the compression engine 156. The PRUC information generation and coding block 174 may be enabled to generate one or more local motion vectors and a global motion vector based on the motion vector information. The motion vector information may comprise at least one of: scaling information, resolution information and reference pictures.

The PRUC information generation and coding block 174 may be enabled to use motion prediction to determine block local motion vectors and their related information, for example, confidence and operating modes, global motion vector between two pictures to be coded, and other supplemental information, for example, a scene change flag. The PRUC information generation and coding block 174 may be enabled to determine optimal block motion vectors with confidence measurements for deriving artificially interpolated or inserted pictures in a receiver in order to support applications with a higher picture-rate display. The PRUC information generation and coding block 174 may be enabled to determine optimal block motion vectors with confidence measurements for reconstructing original pictures with motion-compensation in order to support applications with a lower picture-rate display due to channel capacity restriction.

The VLC 176 may be enabled to encode the generated PRUC data. The video encoding system 152 may be enabled to communicate the encoded generated PRUC data to a decoder, for example, the video decoding system 154 in order to enable generation of a plurality of interpolated pictures. The video encoding system 152 may be enabled to communicate the encoded generated PRUC data via a sideband 175 to a decoder, for example, the video decoding system 154.

The compression engine 156 may be enabled to encode the received video data and communicate the encoded data to the video decoding system 154. The decompression engine 178 may be enabled to receive the encoded received data from the video encoding system 152. The video decoding system 154 may be enabled to receive the encoded PRUC data from the video encoding system 152 via a sideband 175.

The VLD 180 may comprise suitable logic, circuitry and/or code that may be enabled to receive an encoded video stream from a video encoder, for example, VLC 164. The VLD 180 may be enabled to decode the received encoded video stream and generate block motion vectors based on decoding the received encoded video stream.

The inverse quantizer 182 may comprise suitable logic, circuitry and/or code that may be enabled to generate quantized residue data. The inverse transform block 184 may comprise suitable logic, circuitry and/or code that may be enabled to generate reconstructed residual pictures to the summer 185.

The prediction block 186 may comprise suitable logic, circuitry and/or code that may be enabled to receive one or more motion vectors from the VLD 180 in order to generate a motion compensated block of pictures. The summer 212 may be enabled to add the motion compensated block of pictures to the reconstructed residual pictures to generate one or more decoded pictures. One or more decoded pictures may be fed back to the prediction block 186. The prediction block 186 may be enabled to generate a motion compensated block of pictures from a reference image or a previous output picture based on receiving one or more motion vectors from the VLD 180.

The VLD 180 may be enabled to decode the received encoded PRUC data. The encoder assisted PRUC block 190 may comprise suitable logic, circuitry and/or code that may be enabled to extract information, for example, motion vectors, picture and macroblock coding types and quantized residue data from the decompression engine 178. The encoder assisted PRUC block 190 may be enabled to generate a plurality of interpolated pictures based on the received PRUC data from the video encoding system 152 and the extracted information from the decompression engine 178.

Figure 1C:
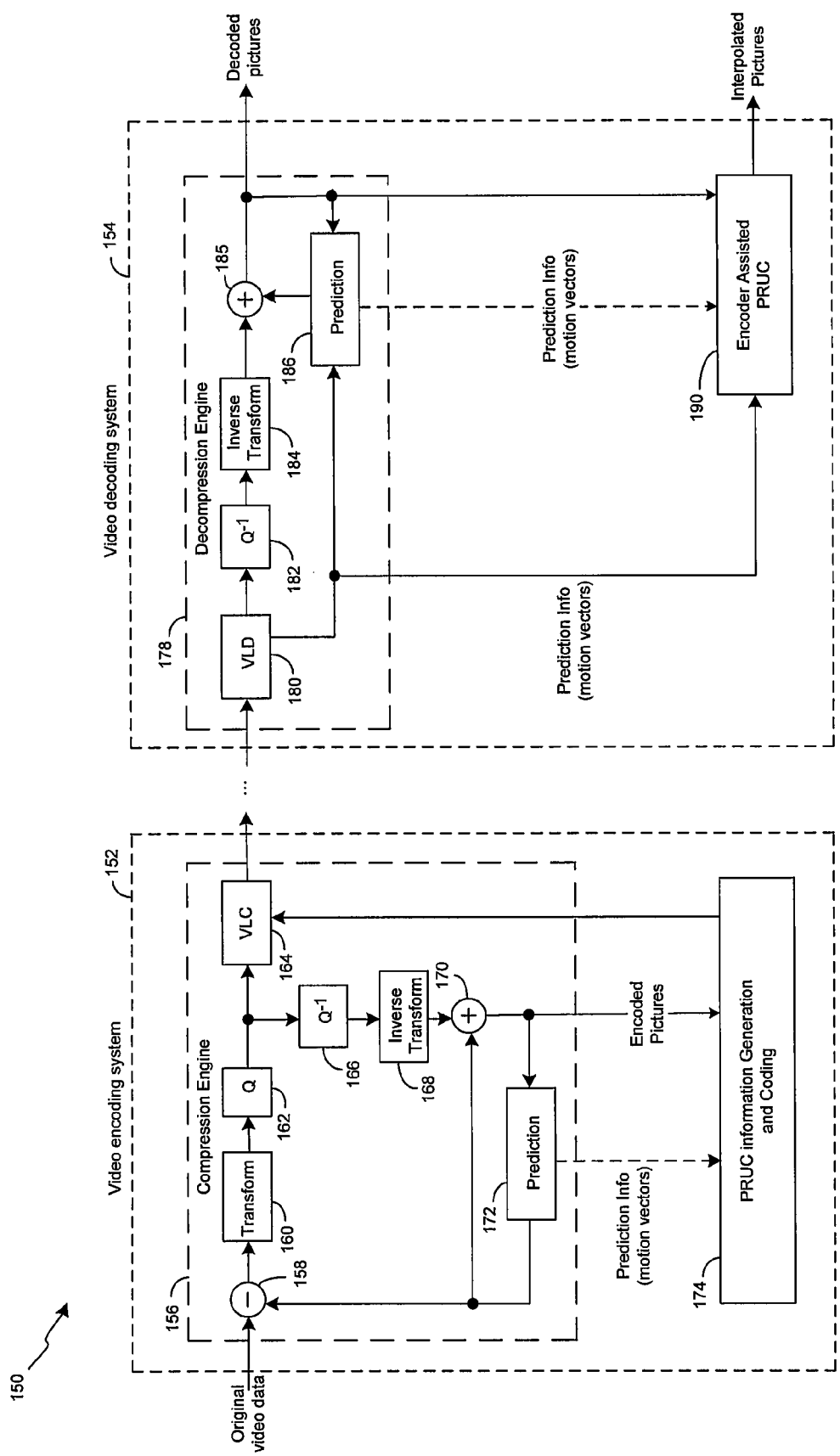
FIG. 1C is a block diagram of an alternative embodiment of an exemplary video processing system for video compression with integrated PRUC, in accordance with an embodiment of the invention.

FIG. 1C is a block diagram of an alternative embodiment of an exemplary video processing system for video compression with integrated PRUC, in accordance with an embodiment of the invention. Referring to FIG. 1C, there is shown a video processing system 150. The video processing system 150 may comprise a video encoding system 152 and a video decoding system 154. The video encoding system 152 and the video decoding system 154 may be associated with a particular video standard, for example, MPEG-2, H.264/MPEG-4 AVC, VC1 and VP6.

The video encoding system 152 may comprise a compression engine 156, a PRUC information generation and coding block 174 and a variable length entropy encoder (VLC) 176. The compression engine 156 may comprise a subtractor 158, a transform block 160, a quantizer 162, a VLC 164, an inverse quantizer 166, an inverse transform block 168, a summer 170 and a prediction block 172.

The video decoding system 154 may comprise a decompression engine 178, an encoder assisted PRUC block 190 and a variable length entropy decoder (VLD) 188. The decompression engine 178 may comprise a VLD 180, an inverse quantizer 182, an inverse transform block 184, a summer 185 and a prediction block 186. The plurality of blocks illustrated in FIG. 1C may be substantially as described in FIG. 1B.

The VLC 164 may be enabled to encode the generated PRUC data. In accordance with an embodiment of the invention, the video encoding system 152 may be enabled to communicate the encoded generated PRUC data to the video decoding system 154 by embedding the generated encoded PRUC data within the encoded received video data prior to the communication to the decoder. The video encoding system 152 may be enabled to communicate the encoded generated PRUC data as supplemental enhancement information (SEI) or as a plurality of picture types to the video decoding system 154. The VLD 180 may be enabled to decode the received encoded PRUC data.

Digital video compression algorithms, for example, MPEG-2, MPEG-4, VC1 and VP6 may allow forward and backward predictive and bidirectional predictive coding that may result in the generation of P and B pictures respectively. Motion compensated predictive coding may be enabled to exploit the temporal correlation between consecutive pictures. The video encoding system 152 may generate motion vectors (MV) between pictures within an allowed temporal window. These motion vectors may be utilized for motion compensation in video compression encoding and decoding processes. In the compressed video stream, the motion compensated information, for example, macroblocks may comprise coded motion vector data and transformed residual data.

Figure 2A:
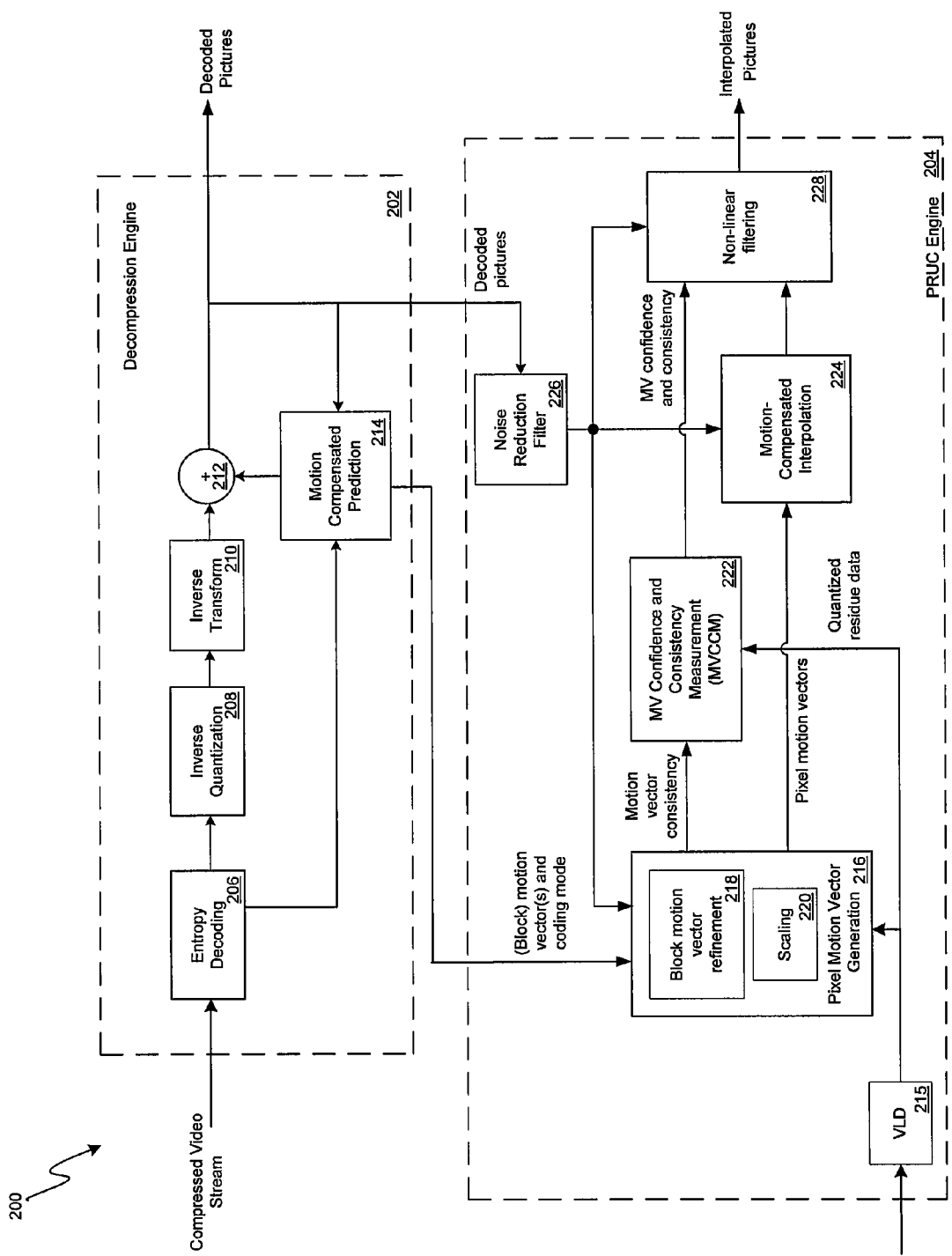
FIG. 2A is a block diagram of an exemplary picture rate up-conversion system, in accordance with an embodiment of the invention.

FIG. 2A is a block diagram of an exemplary picture rate up-conversion system, in accordance with an embodiment of the invention. Referring to FIG. 2A, there is shown a video decoding system 200. The video decoding system 200 may comprise a decompression engine 202 and a encoder assisted PRUC 204. The decompression engine 202 may comprise a VLD 206, an inverse quantization block 208, an inverse transform block 210, a summer 212 and a motion compensated prediction block 214.

The encoder assisted PRUC 204 may comprise a VLD 215, a pixel motion vector generation block 216, a motion vector confidence and consistency measurement (MVCCM) block 222, a motion compensated interpolation block 224, a noise reduction filer 226 and a non-linear filtering block 228. The pixel motion vector generation block 216 may comprise a block motion vector refinement block 218 and a scaling block 220.

The decompression engine 202 may be a video decoder associated with a particular video standard, for example, MPEG-2, H.264/MPEG-4 AVC, VC1 and VP6. The VLD 206 may comprise suitable logic, circuitry and/or code that may be enabled to receive a compressed video stream from the video encoding system 152. The VLD 206 may be enabled to generate block motion vectors based on decoding the received compressed video stream.

The inverse quantization block 208 may comprise suitable logic, circuitry and/or code that may be enabled to generate quantized residue data. The inverse transform block 210 may comprise suitable logic, circuitry and/or code that may be enabled to generate reconstructed residual pictures to the summer 212.

The motion compensated prediction block 214 may comprise suitable logic, circuitry and/or code that may be enabled to receive one or more motion vectors from the VLD 206 to generate a motion compensated block of pictures. The summer 212 may be enabled to add the motion compensated block of pictures to the reconstructed residual pictures to generate one or more decoded pictures. One or more decoded pictures may be fed back to the motion compensated prediction block 214. The motion compensated prediction block 214 may be enabled to generate the motion compensated block of pictures from a reference image or a previous output picture based on receiving one or more motion vectors from the VLD 206.

The encoder assisted PRUC 204 may be enabled to extract information, for example, motion vectors, picture and macroblock coding types and quantized residue data from the video decompression engine 202.

The noise reduction filter 226 may comprise suitable logic, circuitry and/or code that may be enabled to receive a plurality of decoded pictures from the decompression engine 202. The noise reduction filter 226 may be enabled to perform de-blocking, de-ringing, or other noise reduction filtering on the received decoded pictures. The noise reduction filter 226 may generate a filtered output to the pixel motion vector generation block 216, the motion compensated interpolation block 224 and the non-linear filtering block 228.

A blockiness artifact may be caused by distorting the distribution or spectrum of the block transform domain by a quantizer. The blockiness artifact may be related to a lower spectrum coefficient or frequency distortion by the quantization. The blockiness artifact may be visible on the block boundaries, for example, 8×8 pixels for MPEG 1, 2 and 4 and both 4×4 pixels and 8×8 pixels for MPEG4 part 10 AVC, for example. The blockiness artifact may be perceived in flat texture areas in a given picture or video, for example.

The ringing encoding artifact may be also referred to as a mosquito artifact and may be caused by distorting the distribution and/or spectrum of the block transform domain, by a quantizer. The ringing encoding artifact may be related to a higher spectrum coefficient or frequency distortion by the quantization. The ringing encoding artifact may be visible on edges or text boundaries with a flat texture area, for example.

The VLD 215 may comprise suitable logic, circuitry and/or code that may be enabled to decode the received encoded PRUC data. The VLD 215 may be enabled to communicate the decoded PRUC data to the pixel motion vector generation block 216 and the MVCCM block 222.

The pixel motion vector generation block 216 may comprise suitable logic, circuitry and/or code that may be enabled to receive extracted block motion vectors and coding modes from the VLD 206 and decoded PRUC data from the VLD 215. The pixel motion vector generation block 216 may be enabled to determine local block motion vectors and a global motion vector and determine the interpolation and filtering modes. The pixel motion vector generation block 216 may be enabled to accumulate the plurality of block motion vectors in order to estimate a global motion vector (GMV). The pixel motion vector generation block 216 may be enabled to sort motion vectors into a histogram and generate the GMV.

The block motion vector refinement block 218 may comprise suitable logic, circuitry and/or code that may be enabled to refine the motion vectors extracted from the compression video stream and decompose the block motion vectors into pixel motion vectors. The block motion vector refinement block 218 may be enabled to perform a local refinement search and the motion vectors may be refined to sub-pixel precision, for example.

The scaling block 220 may comprise suitable logic, circuitry and/or code that may be enabled to scale the generated motion vectors for interpolated or inserted pictures. The pixel motion vector generation block 216 may be enabled to generate pixel motion vectors, for example, using a local adaptive non-linear filter. The pixel motion vector generation block 216 may be enabled to measure the local motion vector consistency value.

The MVCCM block 222 may comprise suitable logic, circuitry and/or code that may be enabled to measure the extracted quantized residue data and the quantization level from the decoded PRUC data. The MVCCM block 222 may be enabled to generate a motion vector consistency value by comparing adjacent block motion vectors and motion-compensated block boundary pixel differences. For example, smaller quantization levels with less residue data may result in higher motion vector confidence while larger quantization levels and higher residue data may generate lower motion vector confidence. The MVCCM block 222 may be enabled to generate a motion vector confidence value and a motion vector consistency value to the non-linear filtering block 228.

The motion compensated interpolation block 224 may comprise suitable logic, circuitry and/or code that may be enabled to utilize the scaled local and global motion vectors and the noise reduced decoded pictures to generate the interpolated or inserted pictures. The motion compensated interpolation block 224 may be enabled to pass the generated interpolated pictures to the non-linear filtering block 228.

The non-linear filtering block 228 may comprise suitable logic, circuitry and/or code that may be enabled to filter the received interpolated pictures to reduce artifacts in the final output interpolated pictures. The non-linear filtering block 228 may be enabled to utilize the motion vector confidence and consistency measurement value to determine whether motion compensated interpolation is likely to fail. If the non-linear filtering block 228 determines that the motion compensated interpolation is likely to fail, the encoder assisted PRUC 204 may be enabled to switch off picture interpolation across scene changes and continue repeating previous pictures.

In operation, the decompression engine 202 may be enabled to receive compressed video streams comprising low picture rates and decompress the received compressed video streams. The encoder assisted PRUC 204 may be enabled to perform PRUC using motion vectors and other coding information extracted from the compressed video streams and decoded PRUC data received from the VLD 215. The encoder assisted PRUC 204 may be enabled to generate high picture rate interpolated pictures in progressive scanning for display on a modern video display screen, for example, LCD screen or PDP screen.

An artifact known as motion judder may result when the picture rate of a video stream is low. Motion judder may be due to the temporal sampling rate being too low to accurately describe motion in a scene. The motion compensated interpolation block 224 may be enabled to reduce motion judder. The motion compensated interpolation block 224 may be enabled to modify the processing of a picture rate converter so that it may follow moving objects similar to the human eye. The picture may appear clean and sharp as it moves without the motion judder. The encoder assisted PRUC 204 may be enabled to analyze a stream of input pictures to identify each object in the scene to determine how the object may be moving. The encoder assisted PRUC 204 may be enabled to interpolate the location of the plurality of objects at different time instants to generate each output picture.

The encoder assisted PRUC 204 may be enabled to interpolate additional intermediate pictures between coded pictures instead of repeating earlier coded pictures. Motion compensated interpolation may be similar to the generation of predicted pictures, for example, P pictures and B pictures during video compression. In accordance with an embodiment of the invention, the encoder assisted PRUC 204 may not require the transmission of motion vector and residual data to generate one or more interpolated pictures. One or more display devices may perform their own PRUC from the compressed video stream with no additional information other than receiving decoded pictures.

A plurality of interpolated motion vectors may be utilized for isolated macroblocks without motion vectors, for example, intra macroblocks. In accordance with an embodiment of the invention, the encoder assisted PRUC 204 may be enabled to switch-off frame interpolation across scene changes and repeat the previous frame. The non-linear filtering block 228 may be enabled to utilize motion adaptive weighted median filtering, for example, to generate interpolated pictures between an I picture and a previous P picture.

Figure 2B:
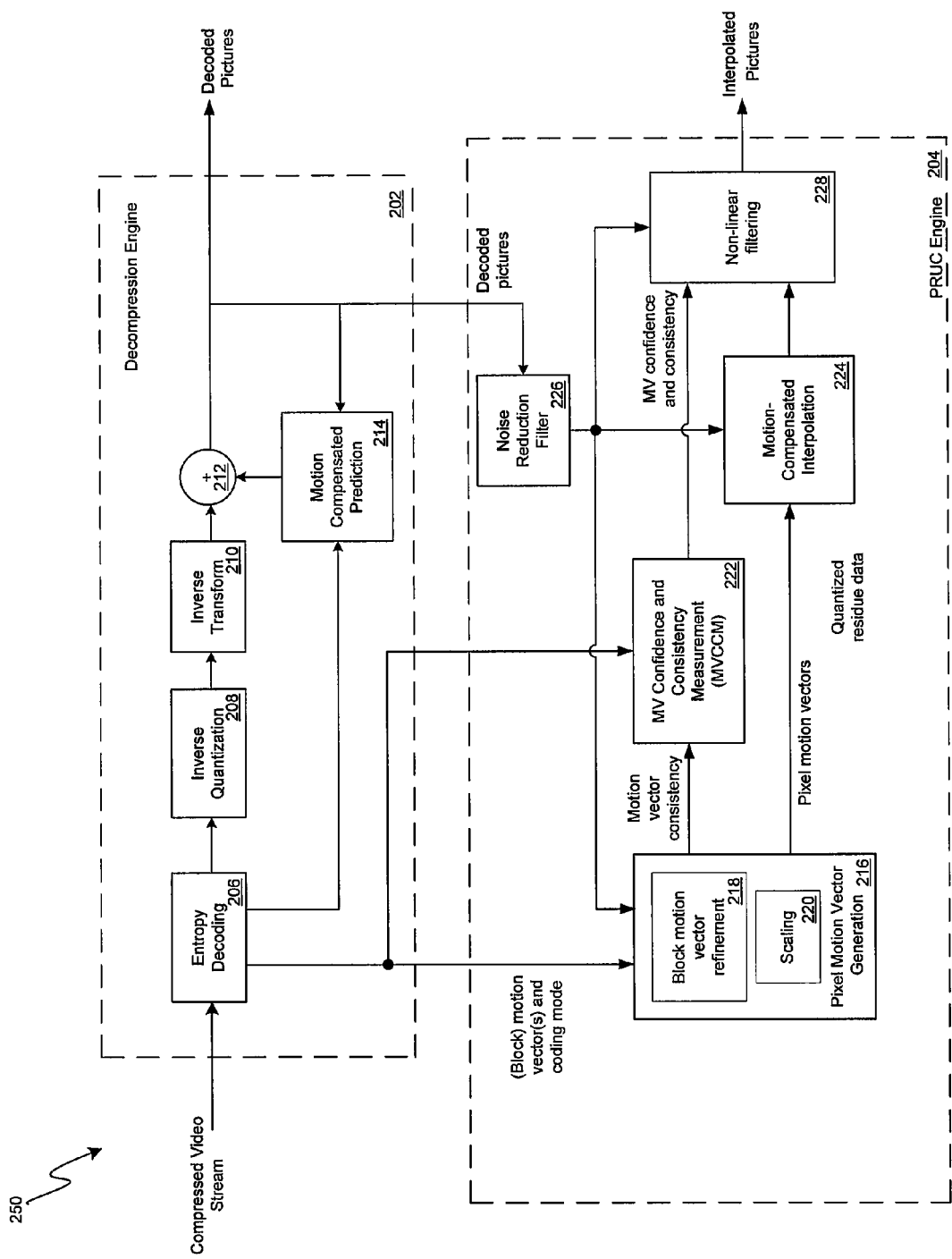
FIG. 2B is a block diagram of an alternative embodiment of an exemplary picture rate up-conversion system, in accordance with an embodiment of the invention.

FIG. 2B is a block diagram of an alternative embodiment of an exemplary picture rate up-conversion system, in accordance with an embodiment of the invention. Referring to FIG. 2B, there is shown a video decoding system 250. The video decoding system 250 may comprise a decompression engine 202 and a encoder assisted PRUC 204. The decompression engine 202 may comprise a VLD 206, an inverse quantization block 208, an inverse transform block 210, a summer 212 and a motion compensated prediction block 214.

The encoder assisted PRUC 204 may comprise a pixel motion vector generation block 216, a motion vector confidence and consistency measurement (MVCCM) block 222, a motion compensated interpolation block 224, a noise reduction filer 226 and a non-linear filtering block 228. The pixel motion vector generation block 216 may comprise a block motion vector refinement block 218 and a scaling block 220. The plurality of blocks illustrated in FIG. 2B may be substantially as described in FIG. 2A.

The decompression engine 202 may be a video decoder associated with a particular video standard, for example, MPEG-2, H.264/MPEG-4 AVC, VC1 and VP6. The VLD 206 may comprise suitable logic, circuitry and/or code that may be enabled to receive a compressed video stream from the video encoding system 152. The VLD 206 may be enabled to generate block motion vectors based on decoding the received compressed video stream. The VLD 206 may be enabled to communicate the decoded PRUC data to the pixel motion vector generation block 216 and the MVCCM block 222.

The encoder assisted PRUC 204 may be enabled to extract information, for example, motion vectors, picture and macroblock coding types and quantized residue data from the video decompression engine 202.

The VLC 164 may be enabled to encode the generated PRUC data. In accordance with an embodiment of the invention, the video encoding system 152 may be enabled to communicate the encoded generated PRUC data to the video decoding system 154 by embedding the generated encoded PRUC data within the encoded received video data prior to the communication to the decoder. The video encoding system 152 may be enabled to communicate the encoded generated PRUC data as supplemental enhancement information (SEI) or as a plurality of picture types to the video decoding system 154. The VLD 206 may be enabled to decode the received encoded PRUC data.

Figure 3A:
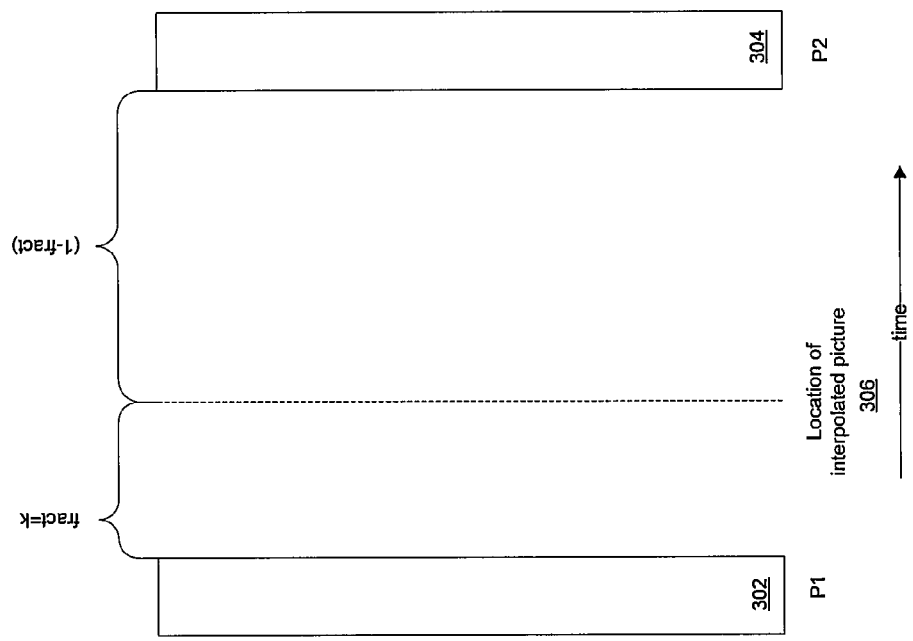
FIG. 3A is a block diagram illustrating insertion of an exemplary interpolated picture between two pictures, in accordance with an embodiment of the invention.

FIG. 3A is a block diagram illustrating insertion of an exemplary interpolated picture between two pictures, in accordance with an embodiment of the invention. Referring to FIG. 3A, there is shown a plurality of coded pictures, for example, P1 302 and P2 304 and the location of an interpolated picture 306. For example, the interpolated picture 306 may be inserted k time units from the coded picture P1 302.

Figure 3B:
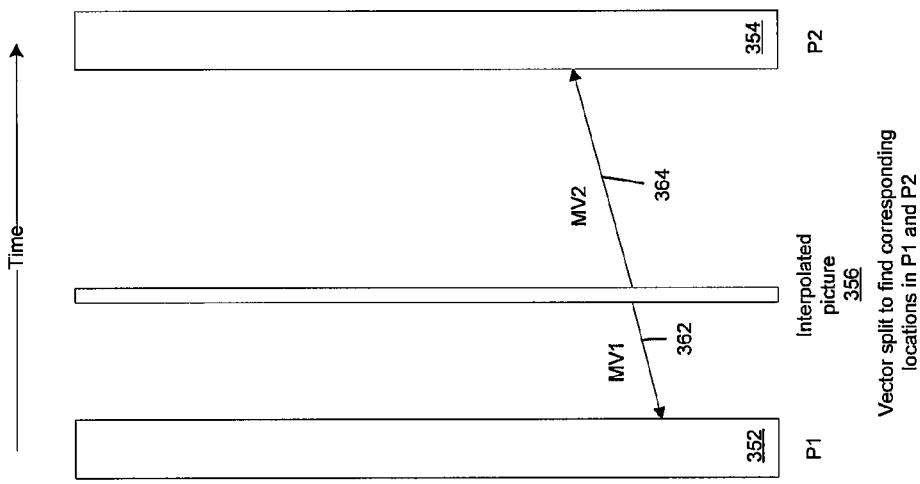
FIG. 3B is a block diagram illustrating exemplary motion vectors of an interpolated picture, in accordance with an embodiment of the invention.
Figure 3B:
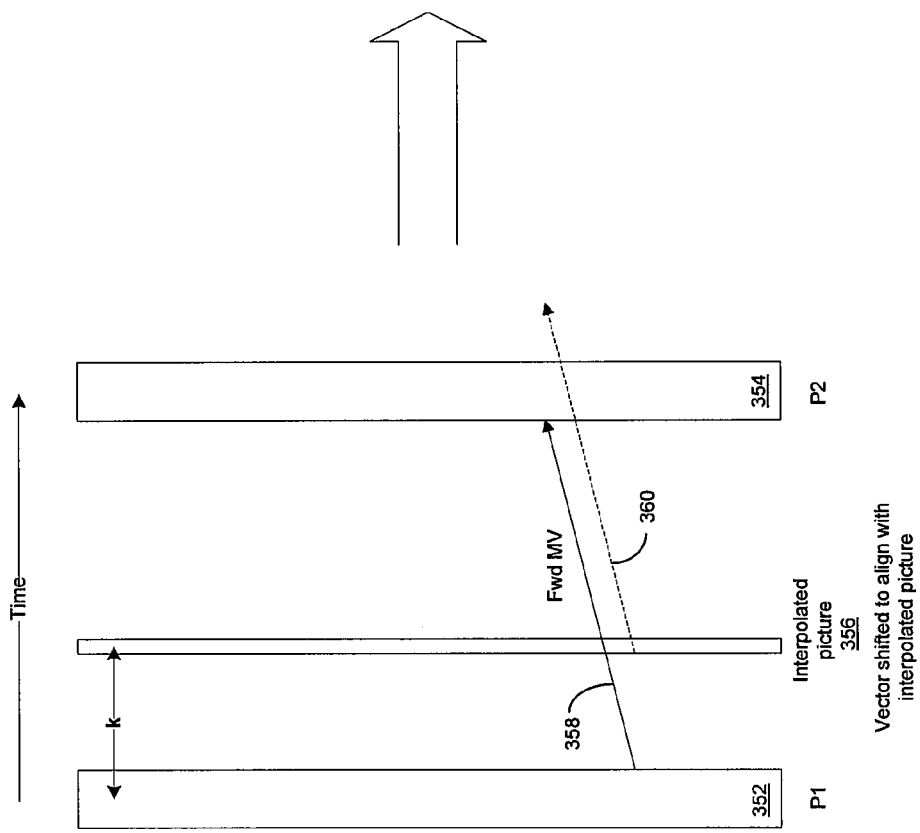

FIG. 3B is a block diagram illustrating exemplary motion vectors of an interpolated picture, in accordance with an embodiment of the invention. Referring to FIG. 3B, there is shown a plurality of coded pictures, for example, P1 352 and P2 354 and an interpolated picture 356. For example, the interpolated picture 356 may be inserted k time units from the coded picture P1 352.

A motion vector 358 may point from an area in the previous picture P1 352 to an area in the next picture P2 354, in such a way that the motion vector 358 may capture the motion that occurred between the two original pictures P1 352 and P2 354. The motion vector 360 may be a shifted version of motion vector 358. The motion vector 360 may be shifted to align with the interpolated picture 356.

The motion vector 360 may be split into two motion vectors, for example, MV1 362 and MV2 364. Each of the estimated motion vectors, for example, motion vector 360 may be split and scaled for motion compensated interpolation. The directions of the two scaled motion vectors, for example, MV1 362 and MV2 364 may be opposite to each other. The length of the scaled motion vector, for example, MV1 362 may be proportional to the temporal difference between the interpolated picture 356 and the original picture P1 352. The length of the scaled motion vector, for example, MV2 364 may be proportional to the temporal difference between the interpolated picture 356 and the original picture P2 354.

Figure 4:
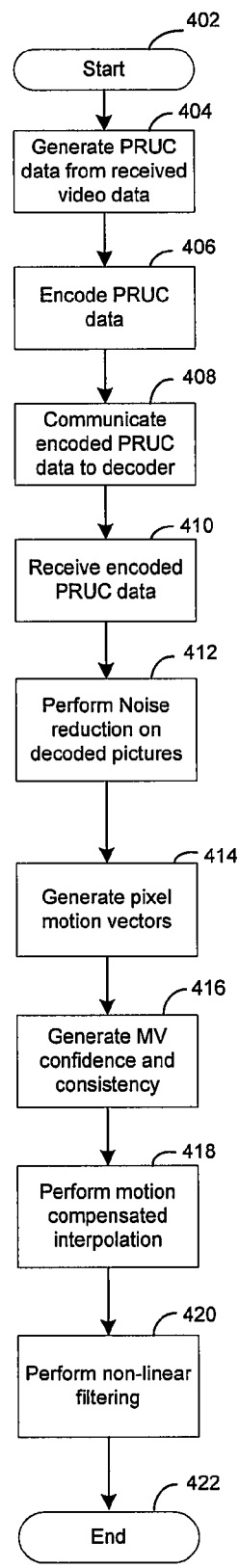
FIG. 4 is a flowchart illustrating exemplary steps for video compression with integrated PRUC, in accordance with an embodiment of the invention.

FIG. 4 is a flowchart illustrating exemplary steps for video compression with integrated PRUC, in accordance with an embodiment of the invention. Referring to FIG. 4, exemplary steps may begin at step 402. In step 404, the PRUC information generation and coding block 174 may be enabled to generate PRUC data from received video data while the received video data is being encoded by the compression engine 156. In step 406, the VLC 176 or VLC 164 may be enabled to encode the generated PRUC data. In step 408, the video encoding system 152 may be enabled to communicate the encoded generated PRUC data to the video decoding system 154. In step 410, the video decoding system 154 may be enabled to receive the encoded PRUC data along with the encoded video data. The VLD 188 or VLD 180 may be enabled to decode the received encoded PRUC data.

In step 412, the noise reduction filer 226 may be enabled to perform digital noise reduction filtering on the extracted decoded pictures. In step 414, the pixel motion vector generation block 216 may be enabled to receive a plurality of block motion vectors from the decompression engine 202 and PRUC data from the video encoding system 152 and generate pixel motion vectors based on refining and scaling the received plurality of block motion vectors.

In step 416, the MVCCM block 222 may be enabled to generate a motion vector confidence and consistency measurement value. In step 418, the motion compensated interpolation block 224 may be enabled to perform motion compensated interpolation in order to generate interpolated pictures. In step 420, the non-linear filtering block 228 may be enabled to detect scene changes and filter the interpolated pictures to reduce artifacts in the final output interpolated pictures. Control then passes to end step 422.

In accordance with an embodiment of the invention, a method and system for video compression with integrated picture rate up-conversion (PRUC) may comprise a PRUC information generation and coding block 174 that may be enabled to generate PRUC data from received video data while the received video data is being encoded by the compression engine 156. The variable length entropy encoder (VLC) 164 or 176 may be enabled to encode the generated PRUC data. The video encoding system 152 may be enabled to communicate the encoded generated PRUC data to a decoder, for example, the video decoding system 154 in order to enable generation of a plurality of interpolated pictures. The video encoding system 152 may be enabled to communicate the encoded generated PRUC data via a sideband 175 to a decoder, for example, the video decoding system 154. In another embodiment of the invention, the video encoding system 152 may be enabled to communicate the encoded generated PRUC data to a decoder, for example, the video decoding system 154 by embedding the generated encoded PRUC data within the encoded received video data prior to the communication to the decoder. The video encoding system 152 may be enabled to communicate the encoded generated PRUC data as supplemental enhancement information (SEI) or as a plurality of picture types to a decoder, for example, the video decoding system 154.

The video encoding system 152 may be enabled to communicate the encoded generated PRUC data to a decoder, for example, the video decoding system 154 in order to enable motion compensation of the original pictures or encoded received video data. The generated PRUC data may comprise one or more of: motion vector information, interpolation block size, adaptive interpolation parameters, block coding modes, quantization levels, quantized residual data and/or encoded pictures from the compression engine 156. The PRUC information generation and coding block 174 may be enabled to generate one or more local motion vectors and a global motion vector based on the motion vector information. The motion vector information may comprise at least one of: scaling information, resolution information and reference pictures.

Another embodiment of the invention may provide a machine-readable storage, having stored thereon, a computer program having at least one code section executable by a machine, thereby causing the machine to perform the steps as described herein for video compression with integrated picture rate up-conversion (PRUC).

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
   encoding a stream of received video data;
   generating picture rate up-conversion (PRUC) data from said received video data;
   encoding said generated PRUC data;
   embedding said encoded PRUC data as a plurality of picture types in said encoded stream of received video data, said encoded PRUC data embedded as a plurality of picture types; and
   communicating said encoded PRUC data embedded in said encoded stream of received video data to a decoder to enable generation of a plurality of interpolated pictures.

2. The method according to claim 1, wherein said decoder is operable to utilize said communicated encoded PRUC data to interpolate additional intermediate pictures for display between coded pictures of said received video data instead of repeating display of earlier coded pictures of said received video data.

3. The method according to claim 1, wherein said decoder is operable to utilize motion adaptive weighted median filtering to generate said interpolated pictures between an I picture and a previous P picture.

4. The method according to claim 1, wherein said PRUC data is generated from said received video data while said received video data is being encoded.

5. The method according to claim 3, comprising embedding said encoded PRUC data within said encoded stream of received video data prior to said communication to said decoder.

6. The method according to claim 3, comprising communicating said encoded PRUC data to said decoder in order to enable motion compensation of said encoded stream of received video data.

7. The method according to claim 1, wherein said generated PRUC data comprises one or more of: motion vector information, interpolation block size, adaptive interpolation parameters, block coding modes, quantization levels, quantized residual data and encoded pictures.

8. The method according to claim 7, comprising generating one or more local motion vectors and a global motion vector based on said motion vector information.

9. The method according to claim 7, wherein said motion vector information comprises at least one of: scaling information, resolution information and reference pictures.

10. A system for processing video data, the system comprising:
    one or more circuits that enables encoding a stream of received video data;
    said one or more circuits enables generation of picture rate up-conversion (PRUC) data from said received video data;
    said one or more circuits enables encoding of said generated PRUC data;
    said one or more circuits enables embedding said encoded PRUC data as a plurality of picture types in said encoded stream of received video data, said encoded PRUC data embedded as a plurality of picture types; and
    said one or more circuits enables communication of said generated encoded PRUC data to a decoder to enable generation of a plurality of interpolated pictures.

11. The system according to claim 10, wherein said decoder is operable to utilize said communicated encoded PRUC data to interpolate additional intermediate pictures for display between coded pictures of said received video data instead of repeating display of earlier coded pictures of said received video data.

12. The system according to claim 10, wherein said decoder is operable to utilize motion adaptive weighted median filtering to generate said interpolated pictures between an I picture and a previous P picture.

13. The system according to claim 12, wherein said one or more circuits enables embedding of said encoded PRUC data within said encoded stream of received video data prior to said communication to said decoder.

14. The system according to claim 12, wherein said one or more circuits enables communication of said encoded PRUC data to said decoder in order to enable motion compensation of said encoded stream of received video data.

15. The system according to claim 10, wherein said PRUC data is generated from said received video data while said received video data is being encoded.

16. The system according to claim 10, wherein said one or more circuits enables communication of encoded PRUC data as supplemental enhancement information (SEI) to said decoder.

17. The system according to claim 10, wherein said generated PRUC data comprises one or more of: motion vector information, interpolation block size, adaptive interpolation parameters, block coding modes, quantization levels, quantized residual data and encoded pictures.

18. The system according to claim 17, wherein said one or more circuits enables generation of one or more local motion vectors and a global motion vector based on said motion vector information.

19. The system according to claim 17, wherein said motion vector information comprises at least one of: scaling information, resolution information and reference pictures.

20. A non-transitory machine-readable storage medium having stored thereon, a computer program having at least one code section for processing video data, the at least one code section being executable by a machine for causing the machine to:
    encode a stream of received video data;
    generate picture rate up-conversion (PRUC) data from said received video data;
    encode said generated PRUC data;
    embed said encoded PRUC data as a plurality of picture types in said encoded stream of received video data, said encoded PRUC data embedded as a plurality of picture types; and
    communicate said encoded PRUC data to a decoder in order to enable generation of a plurality of interpolated pictures.

21. The non-transitory machine-readable storage medium according to claim 20, wherein said PRUC data is generated from said received video data while said received video data is being encoded.

22. The non-transitory machine-readable storage medium according to claim 20, wherein said at least one code section is executable by the machine for causing the machine to embed said encoded PRUC data within said encoded stream of received video data prior to said communication to said decoder.

23. The non-transitory machine-readable storage medium according to claim 20, wherein said at least one code section is executable by the machine for causing the machine to generate one or more local motion vectors and a global motion vector based on said generated PRUC data.

24. The non-transitory machine-readable storage medium according to claim 20, wherein said at least one code section is executable by the machine for causing the machine to communicate encoded PRUC data as supplemental enhancement information (SEI) to said decoder.

\* \* \* \* \*